（12) United States Patent
Perera (10) Patent No.: US 8,348,137 B1
(45) Date of Patent: Jan. 8, 2013

(54) METHODS FOR MAKING CONNECTION TO MICROWIRES

(75) Inventor: Willorage Rathna Perera, Raynham, MA (US)

(73) Assignee: Pascale Industries, Inc., Pine Bluff, AR (US)

( * ) Notice: Subject to any disclaimer, the term of this patent is extended or adjusted under 35 U.S.C. 154(b) by 0 days.

(21) Appl. No.: 13/506,437

(22) Filed: Apr. 19, 2012

(51) Int. Cl.
  *B23K 31/02* (2006.01)

(52) U.S. Cl. ............... 228/175; 228/180.5; 228/256; 228/259; 228/260

(58) Field of Classification Search .................. None
  See application file for complete search history.

(56) References Cited

U.S. PATENT DOCUMENTS

| | | | | | |
|---|---|---|---|---|---|
| 2,493,434 | A | * | 1/1950 | Yonkers | 29/623 |
| 3,197,845 | A | * | 8/1965 | Intrater et al. | 136/201 |
| 4,453,835 | A | * | 6/1984 | Clawson et al. | 374/185 |
| 5,174,295 | A | * | 12/1992 | Christian et al. | 600/468 |
| 5,184,621 | A | * | 2/1993 | Vogel et al. | 600/381 |
| 5,373,856 | A | * | 12/1994 | Grenouillet | 600/585 |
| 5,388,367 | A | * | 2/1995 | Rydell | 43/43.2 |
| 6,336,269 | B1 | * | 1/2002 | Eldridge et al. | 29/885 |
| 6,485,501 | B1 | * | 11/2002 | Green | 606/200 |
| 6,625,280 | B1 | * | 9/2003 | Kerr et al. | 379/412 |
| 7,785,509 | B2 | * | 8/2010 | Perera et al. | 264/136 |
| 7,832,089 | B2 | | 11/2010 | Perera et al. | |
| 7,926,171 | B2 | | 4/2011 | Perera | |
| 8,178,020 | B2 | * | 5/2012 | Perera et al. | 264/172.11 |
| 8,236,376 | B2 | * | 8/2012 | Perera et al. | 427/196 |
| 2010/0123358 | A1 | * | 5/2010 | Pasquier | 307/125 |
| 2011/0030329 | A1 | | 2/2011 | Perera | |

FOREIGN PATENT DOCUMENTS

JP 59-111216 A * 6/1984

* cited by examiner

*Primary Examiner* — Kiley Stoner
(74) *Attorney, Agent, or Firm* — Michael de Angeli

(57) ABSTRACT

Connections can be made to microwires comprising a conductor of a lower melting point metal (e.g., indium 290) in a sheath of higher melting point polymer (e.g., PETG) by placing a small diameter spring, slightly larger in inside diameter than the outer diameter of the microwire, and of a readily solderable material over the distal end of the microwire. The conductor of the microwire is then soldered to the distal end of the spring in any of several ways that result in a solid member at the distal end of the microwire. The flexible spring provides a flexible support for the microwire, so that as the microwire flexes in use, the spring provides a strain relief; that is, the proximal portion of the spring flexes along with the microwire, so that the microwire bends over some distance rather than at a single point.

18 Claims, 3 Drawing Sheets

METHODS FOR MAKING CONNECTION TO MICROWIRES

FIELD OF THE INVENTION

This invention relates to methods for making connections to "microwires", that is, to methods for making reliable and durable electrical connections to extremely fine electrical wires (on the order of less than 100 microns in diameter) comprising a central electrical conductor of a relatively low melting point metal in an insulative sheath of a polymer of relatively higher melting point. The process does not damage or remove the polymer sheath which is the principal strength-providing component of the microwire, so that the wire strength is not reduced, which is crucial in many applications. The process also provides a connection which can be flexed in use without damaging the connection, allowing the microwires to be employed in flexible electronic devices, such as electronic wearables such as fabrics for garments and the like.

BACKGROUND OF THE INVENTION

The present inventor has described in U.S. Pat. Nos. 7,832,089 and 7,926,171, and in application Ser. No. 12/924,384 (each of which is incorporated herein by this reference) methods for making "microwires", as above, extremely fine electrical wires comprising a central electrical conductor of a relatively low melting point metal in an insulative sheath of a polymer of relatively higher melting point. The wires may typically comprise a central conductor of 35 microns diameter in a sheath of 50-75 microns outside diameter. As referred to in the patents and application mentioned above, making reliable and durable electrical connections to such fine wires presents a significant technical challenge.

More specifically, the following is from cols. 18-19 of U.S. Pat. No. 7,832,089:

"Four methods of achieving a connection to the metal core of the micro-wire have been considered to date: a micro-pin system, an epoxy system, and two methods of removing the polymer sheath. The first two methods are fairly sophisticated, have not been tested, and are discussed below for completeness. Two methods of removing the polymer sheath were tested, as described below.

"Depending upon the polymer sheath hardness (or brittleness), reliable connections to the microwires of the invention can potentially be achieved by a micro-pin system that punctures through the polymer coating, akin to a staple having a larger wire attached thereto, although this becomes increasingly difficult as relatively small (less than 50 microns) wires are employed. Where the metal core is less than 10 microns in diameter, the pin system must be much smaller than the core diameter of 10 microns to reduce the risk of electrical failure at the connecting point. A micro-pin system meeting these requirements has not yet been developed. Clearly, if the microwires of the invention were processed into multiconductor yarns, the odds of making good connections with one or several of the filaments using a micro-pin connector would be increased dramatically as compared with a single-filament conductor. If only signal-level currents were required to be carried, this method of making connection to the micro-wires of the invention might well be adequate.

"Another method of connection that may prove satisfactory after development is to encapsulate the end of a micro-wire (or the ends of a micro-wire bundle) in an epoxy matrix and then polish the epoxy-encapsulated end to expose the microwires. The polished epoxy end can then be gold plated, and a connecting wire soldered thereto, establishing a connection to the core of the wire. Comparable techniques are commonly used in metallurgy when examining material under a scanning electron microscope (SEM).

"A first attempt to remove the polymer sheath from the metal core utilized heat. A heated soldering iron tip was dragged across the micro-wire in an effort to deform the polymer sheath thermally. This effort was not successful. Since the polymer melts at a higher temperature than the metal, the heated tip damaged the metal core even before the polymer was partially removed. If the tip is too sharp, the tip tends to cut the metal wire while it is removing the polymer layer. In a related experiment, a heated metal bar was pushed against the micro-wire in an attempt to reach the metal core without damaging it. This was also unsuccessful. If the bar diameter was too big, the molten polymer together with the metal core was pushed away and establishing a connection to the metal core was nearly impossible.

"Chemical methods of removing the polymer sheath, that is, using a chemical solvent to dissolve the polymer sheath, leaving the core untouched, proved to be more successful. The connection can then be made by soldering, possibly preceded by the epoxy-encapsulation and plating steps discussed above. A list of tested chemicals, microscopic observations, and comments are given in Table 5 of the Final Report. Of the chemicals tested, three chemicals (methylene chloride, ethylene dichloride, and N-methylpyrollidone) were ultimately used successfully to remove the outer core sheaths formed of each of Macrolon 3103, Macrolon 6457, and PETG GN007. The aggressiveness of these chemicals vary from high to low with methylene chloride being the most aggressive and N-methylpyrollidone the least. If the microwires were below 2 mils, the cleaning was done using the least aggressive chemical."

From the above it will be apparent that further improvements in techniques for connecting microwires are required. In particular, as the polymer sheath provides much of the tensile strength of the microwire, connection techniques that involve the removal of the sheath are disfavored.

Further, it will be appreciated that the pin system discussed above, if implemented, could easily damage both the strength-providing polymer sheath and the current-carrying metal core. This may cause the wire to fail prematurely, especially in an application where the wire is bent repeatedly.

Still further, the epoxies that were mentioned in the quotation above were intended to be electrically-conductive epoxies, containing small conductive particles, such as tiny silver flakes or filaments, or carbon nano tubes. However, these particles are not continuous, and are embedded in a nonconductive polymer matrix. Consequently, the conductivity of connections made employing such techniques is far inferior to that of metal to metal connections. In applications where the connection must be highly conductive, these connection methods are unacceptable.

Another important concern arises from the desired use of the microwires. One primary desired use is as a fiber to be used in textile manufacturing, that is, as a component of a garment. In order that the garment will be comfortable the microwires must be flexible, which in itself is readily achieved; however, the connection means provided must be such as to not introduce any "hard points", i.e., points or edges of connection devices or the like where the wire will tend to be flexed repetitively about a small radius as the garment is worn, where the wire is likely to fail.

More specifically, it is important that any connection method that involves a stiffening member at the end of the wire—such as an elongated metal tube into which the end of a length of microwire is inserted, so that a further electrical connection can then made to the tube—be designed so as to avoid any "hard points", e.g., where the wire exits the tube, so that the wire does not tend to be flexed repeatedly at the end of the tube, which would tend to cause the microwire to fracture at that point.

SUMMARY OF THE INVENTION

After preparation of the application resulting in U.S. Pat. No. 7,832,089, further work on the methods of manufacture of the microwires disclosed therein was performed. Firstly, the preferred materials for the conductor and sheath were determined to be indium 290 (indium 97%, balance silver, by weight) and glycol-modified polyethylene terephthalate ("PETG"), respectively (although the invention is not limited to these materials). Further work on connection techniques for these microwires was also performed.

An initial success was achieved in making reliable connection to the conductor of the microwire. Broadly, this can be accomplished by dipping the distal end of the microwire in a bath of molten indium, such that the metal at the end of the conductor is remelted by contact with the indium in the bath, withdrawing the end of the microwire, and letting a "cap" of indium extending around the end of the microwire to cool and solidify. The cap thus formed, which is essentially soldered to the conductor of the microwire, encapsulates the end of the microwire, surrounding the polymer sheath, and is in good electrical contact with the conductor thereof. However, the cap is relatively fragile, as it can be easily scraped off.

Initial work on employing the "cap" technique described above to make the initial connection to the conductor of the microwire and adapting it to be useful in making a permanent and durable connection to an external circuit involved placing the uncapped end of the microwire in a length of small-diameter metal tubing, and dipping the distal end of the tube and the tip of the microwire into the bath of molten indium. A good bond was formed in this manner, provided the material of the tube was readily solderable; in particular, stainless steel tubing (which is readily available in small diameters, being used as surgical tubing) is not well wetted by indium solders. Copper and its alloys are a better choice.

A modification of this approach involved placing a short length of indium wire in the tube along with the end of the microwire and melting the indium wire to solder the tube to the conductive core member of the microwire by dipping the assembly in the indium bath, as above, or by heating the assembly using an external source of heat, such as a soldering iron, or by exposing the assembly to a direct flame. This was also shown to work successfully. The microwire can also be capped by indium, as above, before being soldered to the tube.

However, each of these options involve the problem that a "hard point" is created at the proximal end of the tube; that is, if the tube is then secured to an external circuit element, in use the microwire tends to be flexed about a small radius where the unsoldered end of the microwire extends out of the tube; over time this will lead to fracture of the microwire at this point.

Attempts were made to provide some compliance to the joint between the microwire and the proximal end of the tube, e.g, using nonhardening materials such as ethylene vinyl acetate (EVA) hot-melt glue, silicone rubber or Loctite® soft glue to form a bead between the microwire and the tube, or by sheathing the assembly in heat-shrink tubing. None of these were fully successful.

A better solution was eventually identified, and forms the basis of the present invention. A small diameter elongated coil spring, slightly larger in inside diameter than the outer diameter of the microwire, and of a readily solderable material, is placed over the distal end of the microwire. The concentric ends of the microwire and spring are then dipped in the bath of molten indium, and removed. This has the effect of soldering the conductor of the microwire to the distal end of the spring, while forming a cap of solder extending some distance along the length of the spring. An external conductor can then be affixed to the cap of solder at the distal end of the spring. Moreover, the flexible spring provides support for the microwire, so that as the microwire flexes in use, the spring provides a strain relief, in effect eliminating the hard point formed in the other connection methods discussed above. That is, the spring flexes along with the microwire, so that the microwire bends over some distance, forming a large-radius bend, rather than being bent at a single hard point, over a tight radius.

The solder can be extended some distance, on the order of a few millimeters, along the length of the spring, to further strengthen the connection. Connections can then be made by crimping, soldering or spot welding suitable conventional connectors over the soldered spring.

The proximal end of the spring can also be adhesively bonded to the microwire, to resist the microwire being pulled out of the spring in use; the central portion of the spring then flexes preferentially in response to bending loads, preventing the microwire from sharply bending.

In a further improvement, the spring may also be provided with a close pitch towards its ends and a wider pitch in its center, to control its bending characteristics. More specifically, the central, widely-pitched section of the spring is preferentially flexed when a bending load is applied to the microwire, so that the bend takes place over some distance and takes a large radius, while the proximal closely-pitched section strengthens the microwire and prevents formation of a hard point at the proximal end of the spring. The external connection is then made to the distal closely-pitched section of the spring, which is essentially impregnated with solder. Still further improvements are made by use of more sophisticated spring designs, as discussed in detail below.

BRIEF DESCRIPTION OF THE DRAWINGS

The invention will be better understood if reference is made to the accompanying drawings, in which:

FIG. 1 (a) is a cross-sectional view of the tip of a length of microwire, about to be dipped into a crucible of molten solder;

FIG. 1(b) is a cross-sectional view of the tip of the microwire having had a solder cap applied;

DETAILED DESCRIPTION OF THE PREFERRED EMBODIMENT

Figures 1, 2, 3, 4:
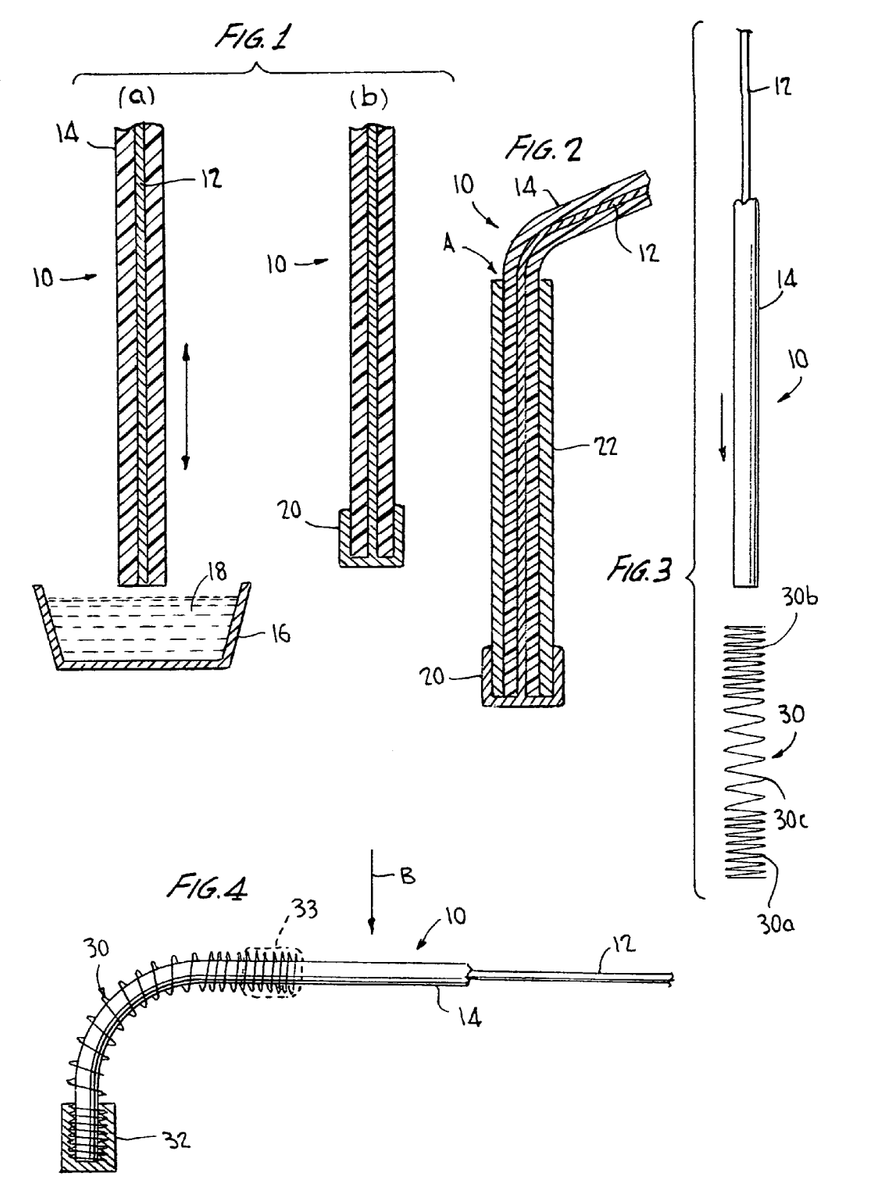
FIG. 2 is a cross-sectional view of the tip of the microwire having been inserted into a length of small-diameter metal tubing and having had a solder cap applied.
FIG. 3 is a schematic diagram of the process of inserting the end of a length of microwire into a variably-pitched spring.
FIG. 4 is a cross-sectional view of the tip of the microwire having been inserted into a spring and having had solder applied thereto.

As mentioned above, it was found that a good electrical connection could be made to the central conductor of a microwire by dipping the tip of the microwire in a bath of molten indium, e.g. indium 290, withdrawing the tip, and allowing it to cool. (Fluxes may be used in this process to remove oxides and improve wettability, as discussed below.) This process is shown schematically in FIGS. 1 (a) and (b). As shown by FIG. 1 (a), the microwire 10, comprising a central conductor 12 of a lower-melting point metal, such as indium 290, in a sheath 14 of a higher-melting point polymer, such as PETG, is dipped into a bath 18 of molten solder, e.g., indium 290, in a crucible 16. The crucible is heated to just above the melting point of the solder by a heater (not shown). Where the material of the bath is indium 290, a suitable temperature range is 340F-392 F, and the connection can be effectively made by dipping the end of the microwire in the bath for up to on the order of 30 seconds. The result is shown in FIG. 1 (b): a cap 20 of indium 290 is formed over the tip of the microwire 10. The cap 20 is essentially soldered to and integral with the conductor 12, since some melting of the conductor takes place when it contacts the indium bath. The sheath 14, being of higher-melting-point material, is essentially unaffected. In this connection it will be appreciated that although the polymer melting point is much higher, exposure of the polymer to such temperatures for an extended period of time may cause the polymer to soften and deform. Accordingly it is preferred to perform this step quickly.

Indium 281 (58% bismuth, 42% tin, liquidus and solidus temperature 281F), was also successfully used in this process to make a cap 20 over a microwire having an indium 290 core. Indium 281 is known for soldering joints and good joint durability is well reported in the literature. However, it must be noted that the conductivity of In 281 is only 4.5% that of copper, which would preclude its use in some applications. In contrast to indium 281, the conductivity of Indium 290 is about 23% that of copper.

Similarly, Indium 4 (100% indium, liquidus temperature 314 F, conductivity 24% of copper); Indium 1E (52% indium, 48% tin, liquidus temperature 244 F, conductivity 11.7% of copper), and Indium 121 (96.5% tin, 3.5% silver, liquidus temperature 430F, conductivity 16% of copper) were all successfully utilized as solders in this process.

It should be noted that as used herein to make a "soldered" connection, e.g., to form a cap of solder in contact with the conductor 12 of the microwire, means to make a reliable electrical and mechanical connection between the members involved by allowing molten solder to flow between and around the members to be joined and then cooled and solidified. The soldering process forms a metallic connection between the members of the joint and when solidified mechanically "entangles" them with the solidified solder, forming both an electrical and mechanical bond. The term also includes the making of a mechanical bond between the solder and the polymer sheath, in that the solder diffuses to a degree into the polymer. Further, the term specifically includes the circumstances where one of the members is formed of the solder itself (e.g., the solder cap 20 of FIGS. 1 and 2), where one or both of the members is partially melted (e.g., the conductor 12), such that an intermetallic or chemical bond is formed (as discussed further below), and where the solidified solder serves to secure discrete components in physical and electrical contact with one another.

More specifically, if the material of the solder is different from that of the microwire core, an intermetallic bond is formed. If the solder is the same as the core material then the connection is made by chemical bonding; that is, the molten core and solder form a homogeneous melt, which is then solidified.

To further detail this process, it was noted in early experiments that if the crucible were narrow and deep, e.g. 4 mm in diameter and 10 mm deep, residual stresses in the microwire when it was inserted into the hot crucible caused it to curl up, making it difficult to insert the tip of the microwire into the bath accurately. A wide shallow bath as shown is more suitable.

It was also found to be desirable to clean the tip of the microwire with acetone before the dipping step.

The cap 20 thus formed makes a good connection to the conductor 12, and is adequate for testing continuity and the like, but is too delicate for making permanent connections, e.g., to external circuitry.

A first attempt to strengthen the connection involved inserting the end of the microwire into a metal tube 22 and dipping the end of this assembly into the molten bath, as above. See FIG. 2. The wire end was juxtaposed to the end of the tube, that is, was either flush with or slightly inside the end of the tube. This worked reasonably well in that the molten indium solder penetrated into the tube by capillary action and bonded well to both the conductor 12 and tube 22, provided that a readily-solderable material was chosen for the tube 22, and a durable connection was formed. It was also not difficult to secure an external connection to the tube 22. However, at the proximal end of the tube 22, a "hard point" was created. That is, when the microwire was flexed in service, it tended to be sharply bent at the proximal end of the tube 22, point A, and tended to fail there.

Attempts were made to soften the hard point thus created by insertion of the end of the microwire into the tube 22, for example by placing a bead of nonhardening material at the proximal end of tube 22, or by placing a length of heat-shrinkable tubing over the proximal end of the tube 22, so as to limit the amount of bending encountered by the microwire at the end of the tube 22. None were fully successful.

FIGS. 3-6 illustrate a solution to this problem which has proven successful in avoiding formation of a hard point at which the microwire tends to be bent around a small radius and break, while permitting connection to an external circuit to be made readily, thus meeting the goals of the invention. In essence, the solution is to insert the end of the microwire into a spring, solder the end of the conductor of the microwire to the distal end of the spring by dipping the end of the assembly of the microwire and spring into a bath of molten indium, as above, and then make the connection to the distal end of the spring. Accordingly, when a bending load is applied to the microwire, the spring limits its bending to a comparatively large radius, thereby preventing formation of a hard point, and providing substantial strain relief to the microwire.

In a successfully-tested embodiment, the spring chosen was a varying-pitch spring 30 (see FIG. 3) having a higher pitch at its distal and proximal ends, 30a and 30b respectively, and a lower pitch in its central section 30c. Such springs are available from Motion Dynamics Corp., of Fruitport, Mich. In a typical successfully-tested embodiment, where the microwire was 75 microns (i.e., 0.0029") in diameter, the inside diameter of the spring was 0.003" and it was formed of wire of 0.004"diameter. The material of the spring was gold-plated copper-beryllium alloy which proved to be readily soldered using the indium solders mentioned above. The distal and proximal ends, 30a and 30b were "close-pitched", that is, such that the coils or "pitches" essentially contacted one another, and the pitch of the central section 30c was 0.0075".

These dimensions can of course vary considerably within the scope of the invention. The spring can be ordered with such a varying pitch, or a spring of a single pitch can be readily modified, e.g., the central section of a spring of the higher pitch can be stretched beyond its elastic limit to form the lower-pitched central section.

As indicated in FIGS. 3 and 4, the process of securing the spring to the microwire comprises the simple steps of inserting the end of the microwire 10 into the spring 30, as indicated by FIG. 3, and then dipping this assembly into the bath of molten indium, as above. As above, this step is performed such that the end of the microwire 10 is juxtaposed to the end of the spring, that is, is substantially flush with or slightly inside the distal end of the spring 30, and is performed without removal of the polymer sheath 14 over the conductor 12, as shown. The result is shown in FIG. 4, in an example where most of the distal high-pitched end 30a of the spring 30 has been dipped into the bath, such that this portion 30a of the spring 30 as well as the end of the microwire have been soldered into an essentially solid end cap 32.

The advantage of the varying high/low/high pitch spring 30 is that the closely-pitched spring wire at its distal end 30a is wetted by a considerable amount of solder, being essentially impregnated by solder, and forming a solid and reliable bond. The bonding can be further improved by further techniques discussed below. The close pitch of the spring 30 at its proximal end 30b provides good support for the microwire where it exits the spring, so that it does not tend to flex at the proximal end of the spring, reducing the chance of wire failure due to strain fatigue. In a further improvement, a small quantity 33 of an elastomeric adhesive such as a hot-melt glue or "room-temperature vulcanizing" ("RTV") silicone can be impregnated into the coils of the proximal section 30b of the spring, so as to further protect the microwire where it exits the spring 30. Finally, the low pitch in the central section 30c of the spring 30 is more flexible than the higher-pitched ends, so that as the microwire flexes in response to a lateral bending load indicated schematically at B, the spring bends preferentially in this central section 30c. The resilience of the spring wire causes the bend to take place around a relatively large radius, as shown, so that the microwire is not bent at a "hard point" and is reliable over many cycles of bending. As noted, the high pitch proximal section 30b protects the microwire, so that the microwire does not experience a hard point where it exits the spring. See FIG. 4, illustrating the flexing of the spring-terminated microwire 34 in response to a bending load B.

Figures 5, 6:
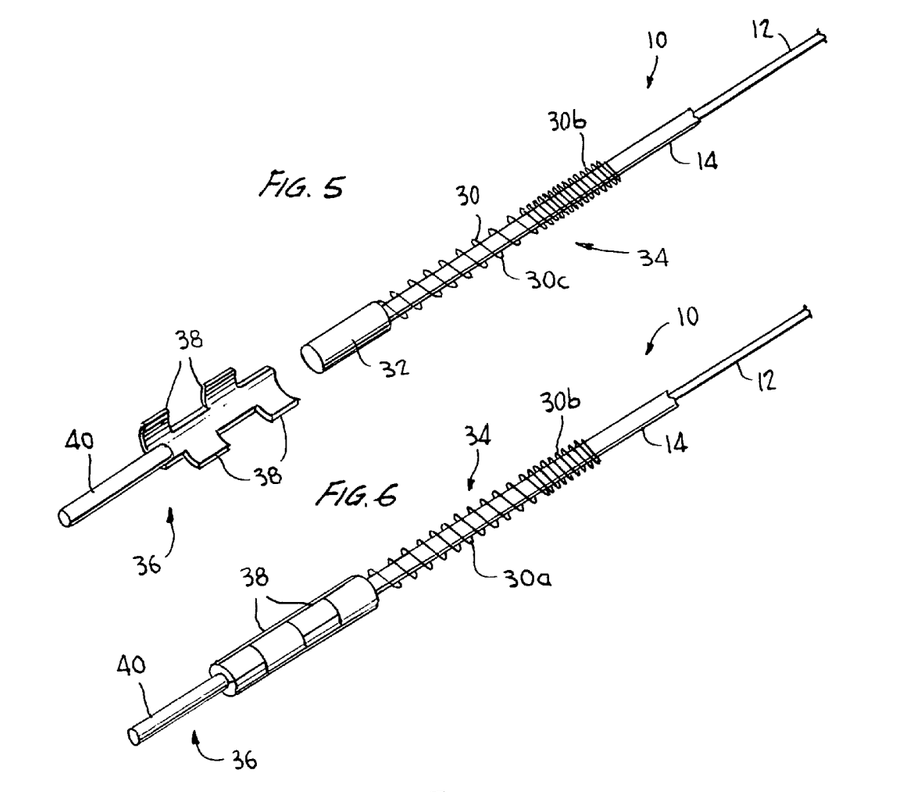
FIG. 5 is a schematic view of the product of FIG. 4 being inserted into a crimpable or connector.
FIG. 6 shows the product of FIG. 5 having had the connector crimped to the end of the microwire, over the spring.

FIGS. 5 and 6 illustrate a simple method of joining the spring-terminated microwire 34 to an external circuit. The portion of the spring-terminated microwire that has been effectively encased in solder, covered by a cap of solder 32 extending some distance along the length of the distal end 30a of the spring 30, as noted, is placed between the crimping ears 38 of a crimpable connector 36 also comprising an elongated pin 40. See FIG. 5. The ears 38 are then bent toward one another so as to capture the distal end of the spring-terminated microwire 34. See FIG. 6. As illustrated, this is done such that the low-pitch central section 30c of the wire is outside the connector 36. In this way the central section 30c of the spring can bend as the stresses are exerted on the microwire—for example, if the microwire is woven into a garment fabric, as the wearer moves or the garment is laundered—without breaking the connection of the microwire's conductor to the spring, while the high-pitched proximal section 30b of the spring closely encases the microwire and protects it from sharp bends where it exits the center of the spring 30. Comparable results can be achieved by connecting the spring to a suitable connector by spot welding, soldering, ultrasonic welding or similar methods.

To make a connection to an external circuit the pin 40 of connector 36 can then simply be inserted into a mating female connector (not shown). Suitable crimpable, solderable, or spot-weldable connectors 36 and the mating female connectors are commercially available.

The material and pitch of the spring should be designed with respect to the final product requirements. Stainless steel is difficult to solder at low temperatures and is not recommended for this process. Copper springs provide excellent conductivity and solderability but provide reduced stiffness (or spring action). In addition, copper tends to oxidize easily, decreasing its current carrying capabilities. This oxidation can be minimized if nickel coated copper springs are used. Springs made of copper beryllium alloys (1.5-1.7% beryllium) are known to give good stiffness, spring action, solderability, and conductivity, and are accordingly preferred. The conductivity can be further improved by gold "flashing" the spring—that is, providing a thin coating of gold. Springs of suitable sizes and materials are readily available from Motion Dynamic Corporation, 5625 Airline Road, Fruitport, Mich. 49415.

It is also well-known to employ fluxes in soldering processes, to remove oxides on the surfaces and improve wettability of the members to be joined. In this application, the use of Flux 5RMA or 5R, (available, as are the indium solders mentioned, from Indium Corporation of America, Utica N.Y.) provides excellent wetting properties between the metallic spring and indium solder, In 290 again being useful. The flux can be applied to the metal spring and can be activated by heating to 257 F, e.g., when the end of the spring and the microwire within it are dipped into a solder bath. If In 281 is to be used, an appropriate flux is 5.5 LT activated at 185 F. Note that the flux removes the oxide layer on both indium and metal spring and provides good clean surfaces for effective solder bonding. It will be appreciated that gold resists oxidation and flux may not be necessary for gold flashed springs.

Since the polymer material of the microwire sheath 14 does not oxidize, the flux will not improve wettability of the soldered connection between the polymer and molten indium. However, it was found that roughening the polymer sheath helps to form a strong bond between the indium alloy solder and the polymer sheath, in that the increased roughness of the surface of the polymer will provide increased surface area with which the solder will become "entangled" by diffusion into the polymer, strengthening the bond. Roughening can be effectively accomplished by dipping the microwire end in a gentle polymer solvent such as N-methylpyrollidone for 40 seconds or dipping it in a more aggressive solution of methylene chloride or ethylene dichloride for 10 seconds.

It was also found to be desirable to clean the microwire and spring with acetone before the soldering step, and to cut the end of the microwire off at the distal end of the spring after insertion with a sharp blade.

Further options and improvements to be considered within the scope of the invention are as follows:

A quantity 33 of a relatively flexible material, such as a curable silicone rubber, a soft glue such as Loctite® or an elastomeric hot-melt adhesive, can be provided at the proximal end of the spring, securing the end of the spring to the microwire, to strengthen the microwire and dampen its bending where it exits the spring without introducing a hard point. The pitch of the spring at the proximal end may be chosen with respect to the viscosity of this material to allow this material to flow between the wires of the spring pitches and the microwire to form a good bond. This is discussed further below.

Figure 7:
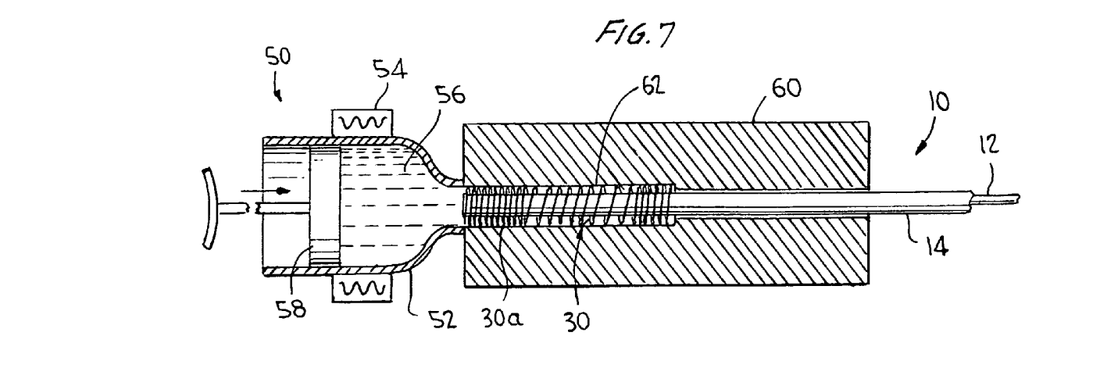
FIG. 7 shows an alternative method of soldering the spring to the microwire.

FIG. 7 shows an alternative method for soldering the spring to the end of the microwire. Rather than dipping the end of the microwire and spring into a bath of molten solder, and allowing capillary action to draw the solder between the turns of the spring, polymer sheath, and conductor, the solder can be provided under light pressure, using a heated solder injection tool 50 akin to a "hot glue" gun. Such a tool might comprise a reservoir 52 for molten solder indicated at 56 with a heater 54 to keep the solder molten, and a syringe-type plunger 58 to exert pressure on the solder 56. The microwire 10 and spring 30 could be held in a clamp 60 with their juxtaposed ends exposed at the outer end of a bore 62 in the clamp 60, forming a small cavity therearound, and the solder injection tool 50 juxtaposed to the opening of the bore 62 in the clamp 60. If pressure were then applied to the plunger 58 of the tool, solder would flow into and fill the bore, while flowing around the ends of the spring and microwire. A better finish on the cylinder of solder thus formed might thereby be achieved than in the dipping process, and this might be advantageous in making reliable connections, especially in an automated process. The clamp 60 might also be heated to ensure that the microwire and spring were at the optimum temperature to ensure good wettability by the solder.

One possible problem with this approach is that the solder might tend to fill the entire bore 62, such that the spring 30 would become a solid member after cooling, destroying the ability of the central section 30c to serve as a strain relief. This could possibly be avoided by only fluxing the distal closely-wound section 30a of the spring 30, so that only section 30a of the spring 30 would be soldered. The bore could also be formed with an internal ridge fitting between the pitches of the spring and closely surrounding the microwire at the end of the distal section 30a of the spring, to prevent solder from flowing past a desired point. Alternatively, or additionally, an anti-fluxing agent could be applied to the central and proximal sections of the spring, to preclude their being wetted by the solder. Another possibility would be to orient the clamp 60 vertically, so that the solder would be injected upwardly, and so that gravity would keep the solder in the lower section of the bore 62, around the distal closely-wound section 30a of the spring 30, while metering the amount of solder injected accordingly, so as to only solder the distal tightly-pitched section 30a to the microwire.

It is also within the invention to simultaneously solder a connector 36 to the distal end 30a of the spring 30 and to the distal end of the microwire 10; this could be done by disposing a connector with a tubular mating end over the distal ends 30a of the spring 30 and microwire 10, in a bore of a clamp 60, and injecting solder into the bore, possibly from one side thereof.

Figure 8:
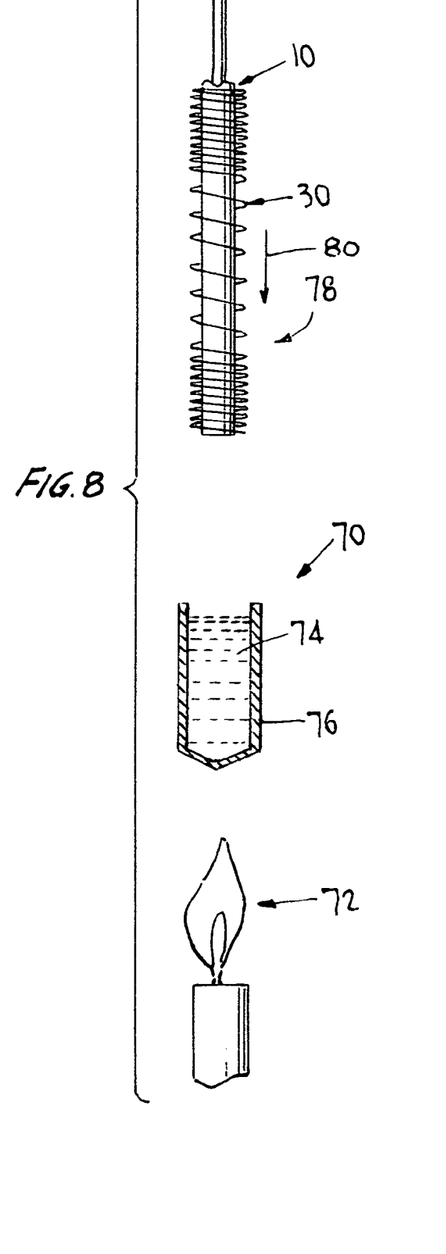
FIG. 8 shows a premade indium cap that can be used in lieu of the crucible of molten solder.

FIG. 8 shows another method of soldering the spring to the central conductor of the microwire, which is advantageous in that the crucible of molten indium is avoided. In this embodiment, a metallic tube of, e.g., copper, tin or gold-flashed tin is first filled with indium solder. For example, such a tube one foot long can be filled with indium solder by disposing one end of the tube in a crucible of molten indium and suction applied to the opposite end to suck the indium into the tube, filling it. As the tube is long as compared to its diameter, it may be necessary to preheat the tube so that the indium does not solidify before being drawn fully into the tube. After cooling and solidification of the indium the tube can be cut into lengths, e.g., one-quarter inch long, with one end pinched shut and the other open, as illustrated by tube section 70 in FIG. 8. The closed end can then be heated, e.g., by holding the tube section over a flame 72; when the indium 74 in the tube 76 has melted, the end of the assembly 78 of a microwire 10 in a spring 30 can be inserted into the tube section; this is then withdrawn from the heat source 72 and allowed to cool. The pinched closed end can then be trimmed off, making a neat connection suitable for assembly to a connector 36 (FIG. 5).

Figure 9:
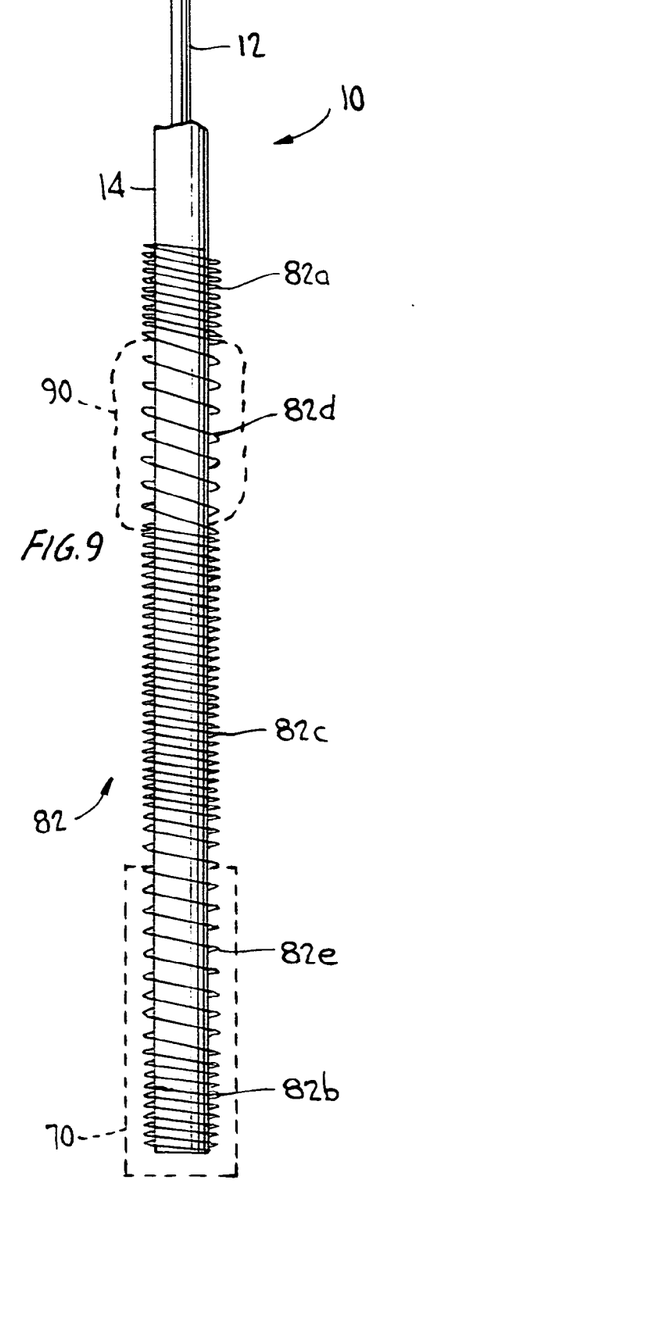
FIG. 9 shows an alternative configuration for the spring.

FIG. 9 shows an alternative spring design that has certain further advantages. In this embodiment, the spring 82 has close-pitched proximal and distal sections 82a and 82b respectively, a closely-pitched central section 82c, and wider-pitched intermediate sections 82d and 82e.

This design is optimized to provide both good mechanical and chemical bonding of the spring to the polymer sheath 14 of the microwire 10, while electrical connection is made, as previously, to the core 12 of the microwire at the distal end of the spring, where it is soldered, as discussed above, to a cap of indium solder, or soldered to a metallic tube section 70 with indium solder therein, as discussed in connection with FIG. 8.

Referring in detail to the intended functions of the five sections of the spring 82, as indicated, the soldered end cap or tube 70 extends over the distal section 82b and the next section 82e. The spring pitch in section 82b needs to be close, as shown, so as to result in a solid, solder-impregnated end. However, if the pitch is too close, solder will not penetrate between the spring pitches, but will tend to form a solid cap over the spring, precluding mechanical entanglement or chemical bonding. The materials and dimensions chosen should be such that capillary action causes indium to flow between the microwire and the inside of the spring, as well as between the pitches. More specifically, the pitch of the spring in this section 82b should be as close as possible, to form a solid member for electrical and mechanical connection, while still permitting good flow of the indium solder therebetween; the material of the spring should similarly be chosen to be readily wetted by the solder. Flux may be helpful here as well.

The next section 82e is of comparatively wider pitch, as illustrated. This spring pitch is chosen so as to ensure good indium penetration through and around the pitches, creating good mechanical entanglement. As above, the ease of penetration of the solder depends on its viscosity and the affinity between spring metal and indium, that is, the relative wettability. This mechanical entanglement of the solder with the spring and with the surface of the polymer sheath 14, together with a degree of chemical bonding between the sheath and solder, provides a degree of protection against the microwire being pulled out of the spring. (It will be appreciated that the bonding between the microwire core 12 itself and the solder is too weak to appreciably resist pulling the microwire 10 from the spring.)

The function of the next section 82c, which is not bonded to the microwire 10, is to define the region where the combination of microwire and spring flexes over a large radius in response to an external bending load, as described above in connection with FIG. 4. The pitch of the spring in this area is chosen accordingly.

The next section 82d is chemically bonded to the sheath 14 of the microwire by a quantity 90 of an adhesive capable of effective bonding to metal and polymer. The pitch of this section of the spring is somewhat open, so that the metal/polymer compatible adhesive 90 can penetrate through the pitches to form a good chemical bond between the metal of the spring 82 and the polymer sheath. This chemical bond provides maximum protection against the microwire being pulled from the spring. As noted, the solder in sections 82b and 82e also provides some degree of similar protection, but the chemical bond formed by adhesive 90 provides the primary resistance to pulling the microwire from the spring.

The adhesive 90 should be selected carefully, with attention being paid to the following properties: a) excellent bonding to metal and polymer; b) some flexibility (typically 4-10% elongation) for durability in use; c) softness for wear comfort; d) fast cure; e) excellent fluidity to penetrate through pitches; f) not messy or greasy; g) preferably one part, for ease of use.

One possible choice for adhesive 90 is a light curing acrylic material, with range of elongations 3-220%. These can be cured in a fraction of a second by a suitable light source. For example, light curing Loctite® 3555 (11.2% elongation, tensile strength 58500 psi) works well.

Another possible choice is a cyanoacrylate adhesive, which does not require a special light source for cure. Room temperature cure Loctite® 435 (elongation 15%, tensile strength 3600 psi) or 4851 (low viscosity flexible, elongation 4%, tensile strength 1800 psi) cyanoacrylates are two recommendations.

Finally, the proximal section 82a is closely pitched, to provide good protection for the microwire where it exits the spring. This section can also be chemically bonded to the microwire by the adhesive 90.

In use, then, of the five-sectioned spring of FIG. 9, because the proximal and distal sections of spring 82 are bonded to the microwire—sections 82b and 82e by solder, and sections 82d, and optionally 82a, by adhesive, section 82c, which is the only portion of the spring that is not bonded to the microwire, accordingly provides flexibility in response to bending loads, so that the assembly of spring and microwire flexes preferentially in this area. The amount of flexibility to bending loads can be controlled by selection of the pitch of the spring in region 82c. The chemical bond between sections 82d and optionally 82a of spring 82 and the sheath 14 of microwire 10 provides substantially all of the resistance to pulling the microwire from the spring 82, while the soldered end cap of sections 82b and 82e provides an efficient and reliable way to make electrical connection to external circuit elements.

It will also be appreciated that it is within the scope of the invention to define the several regions of the spring simply by whether and how they are bonded to the microwire; that is, the spring could possibly be of a single pitch, and solder and adhesive bonding effectively employed to define the distal and proximal regions respectively, stiffening them against bending, while the central unbonded section of the spring defines the region where bending takes place. At present, variation of the pitch of the spring's sections as described is preferred.

Summarizing the advantages of the invention, it will be appreciated that according to the preferred embodiment of the invention a method is provided for assembling a microwire to a spring that results in 1) a continuous metallic connection between the metallic conductor of the microwire and the spring, 2) a solid end that can be spot welded, soldered, or mechanically secured to a electrical connector or other component, 3) the pitches of the distal end of the spring being mechanically entangled and secured to the microwire by solder between the pitches, so as to provide a good point for electrical and mechanical connection to other circuit elements, and assisting in resisting pulling the spring off the microwire, 4) the center section of the spring is not bonded to the microwire, and is less rigid than the other sections of the spring either by virtue of wider pitches (e.g., the FIG. 4 spring), or because the other sections of the spring are bonded to the microwire (e.g., the FIG. 9 spring), thereby providing a preferential bending location so that in use the microwire does not experience bending at a "hard point" and is reliable in use, providing good flexibility to an end product, 5) if adhesive 90 is employed, the spring is chemically bonded to the polymer sheath of the microwire, further securing the spring to the microwire, and 6) the close-pitched proximal end of the spring, optionally being further secured to the microwire by an adhesive, protecting the microwire where it exits the spring.

While a preferred embodiment of the invention has been disclosed, the invention is not limited thereto, but only by the following claims.

What is claimed is:

1. A method of forming a connection to a microwire comprising a central conductor of a lower melting point metal in a sheath of a polymer of higher melting point, comprising the steps of:
    placing an elongated coil spring having first and second ends and made of a solderable material over a proximal end of the microwire, such that the proximal end of the microwire is juxtaposed to a first end of the coil spring;
    supplying molten solder to the proximal end of the microwire and the first end of the spring, the material of said solder being such as to be effectively bonded to the spring, polymer sheath, and metal conductor of the microwire after cooling, without affecting the polymer sheath of the microwire;
    allowing the solder to cool, such that the conductor of the microwire is soldered to the first end of the spring, with a cap of solder extending along a portion of the length of the first end of the spring, while the microwire extends out of the second end of the spring; and
    making an external connection to said cap of solder.

2. The method of claim 1, wherein said spring has a pitch that varies along the length of the spring in order to optimize bonding of the spring to the microwire and to define a preferential bending location.

3. The method of claim 2, wherein said spring is formed to have a close pitch at proximal and distal ends and a wider pitch in a central section, and wherein said cap of solder extends over at least a portion of the close-pitched portion of the spring at its distal end, whereby when a bending load is applied to the microwire, the spring bends preferentially in said central section so that the microwire is prevented from sharply bending.

4. The method of claim 3, wherein the proximal end of said spring is adhesively bonded to the microwire.

5. The method of claim 2, wherein said spring is formed to have a close pitch at distal and proximal ends and in a central section, and a wider pitch in intermediate sections between the distal and proximal ends and the central section.

6. The method of claim 5, wherein the distal end of the spring and the intermediate section adjacent thereto are bonded to the microwire by solder.

7. The method of claim 6, wherein at least the intermediate section of the spring adjacent the proximal end thereof is adhesively bonded to said microwire.

8. The method of claim 7, wherein the proximal end of said spring is also adhesively bonded to said microwire.

9. The method of claim 1, wherein the proximal end of said spring is adhesively bonded to said microwire.

10. The method of claim 1, wherein the material of the central conductor of said microwire is an indium solder.

11. The method of claim 1, wherein the material of the sheath of said microwire is PETG.

12. The method of claim 1, wherein the material of the solder is an indium solder.

13. The method of claim 1, wherein said external connection is made by securing a connector to said cap of solder at the distal and of said spring and microwire.

14. The method of claim 1, wherein the polymer sheath of the microwire is roughened prior to said soldering step, to achieve improved mechanical bonding of said cap to said sheath.

15. The method of claim 14, wherein said roughening step is performed by exposing said polymer sheath to a chemical solvent.

16. The method of claim 1, wherein said step of supplying molten solder to the proximal end of the microwire and the first end of the spring is performed by dipping the proximal end of the microwire and the first end of the spring juxtaposed thereto in a bath of molten solder.

17. The method of claim 1, wherein said step of supplying molten solder to the proximal end of the microwire and the first end of the spring is performed by injecting molten solder into a bore in a clamp in which the juxtaposed ends of the microwire and spring are disposed.

18. The method of claim 1, wherein said step of supplying molten solder to the proximal end of the microwire and the first end of the spring is performed by first providing a section of metallic tube having one end closed and one end open and filled with molten solder, inserting the juxtaposed ends of the microwire and spring into the open end of the tube, and allowing the assembly to cool, whereby the solder makes a secure mechanical and electrical connection between the conductor of the microwire, the spring, and the tube.

* * * * *